April 18, 1950

H. RINIA 2,504,588

DEVICE FOR MEASURING TEMPERATURES AT A DISTANCE

Filed Aug. 30, 1945

INVENTOR
HERRE RINIA

BY *C. F. Wenderoth*

ATTORNEY

Patented Apr. 18, 1950

2,504,588

UNITED STATES PATENT OFFICE 2,504,588

DEVICE FOR MEASURING TEMPERATURES AT A DISTANCE

Herre Rinia, Eindhoven, Netherlands, assignor to Hartford National Bank & Trust Co., Hartford, Conn., as trustee Application August 30, 1945, Serial No. 613,526
In the Netherlands March 10, 1943

4 Claims. (Cl. 73—349)

This invention relates to a device for measuring the temperatures of objects, in which the point of observation is at some distance from the object in question and the heat required for the measuring operation is transferred from this object to an element which is sensitive in regard to temperature and is used in measuring this temperature.

When making use of devices of this type it is known to utilize a thermally conductive metal body which is placed between the object whose temperature is to be measured and a temperature sensitive device, for instance a thermometer or a thermo-electric couple. Through this metal body passes a steady current of heat which, apart from possible radiation losses, brings the temperature-sensitive element to the same temperature as the object to be measured. In the case of temperature variations of the object a decrease or increase of the flowing current of heat should involve a decrease or increase in temperature at the measuring point. However, the inertia in the transmission of such a variation is very high, which constitutes the drawback of this common method.

According to the present invention this drawback is greatly reduced by making the heat transference take place by means of an evaporating and condensing liquid. Consequently, in the device according to the invention the transport of heat takes place through the vaporization or condensation heat of this liquid-vapour. This vapour and the vapour pressure are capable of propagating much swifter through a tube than the molecular flow of heat through a metal wire. This permits the distance between the object and the heating point to be materially increased. In addition temperature variations of the object are transmitted more swiftly, since a variation of this temperature immediately involves a variation of the vapour pressure above the liquid at one point, so that condensation or vaporization immediately occurs at another point, while releasing or withdrawing heat. This is why the process according to the invention is excellently adapted for use in combination with a thermostat, where the speed of the temperature variations plays an important role.

Of course, when making use of the method according to the invention, a liquid must be used which at the temperature or temperature range to be measured has an adequate vapour pressure to permit the transport of vapour at a suitable speed through a tube. When, for instance, the resistance of flow of a vapour in the connecting tube used between the object and the point of observation is about 1 mm. of mercury column, then even liquids having a vapour pressure of 10 mms. mercury column at this temperature, suit the purpose very well, since in this case the resistance of flow in the tube is low relatively to the prevailing vapour pressure. Of course, a higher vapour pressure of the used liquid is not objectionable, as long as it is not too difficult structurally to make a closed system of tubes. At the temperature in question, moreover, the vapour pressure should not be equal to the critical vapour pressure, since otherwise no liquid and gaseous phase is distinguishable.

For the liquid practically all simple materials are suitable whose vapour pressure satisfies the aforesaid conditions at the prevailing temperature. By way of exception mixtures of liquids may also suit the purpose, provided that the boiling points are not too diverse or no chemical reaction takes place at the prevailing temperature. A suitable mixture is, for instance, sodium nitrite, sodium nitrate and potassium nitrate. The heat-transference system should preferably not contain, besides the liquid and the vapour, foreign gases or gases released from this liquid during operation, since by these foreign gases the pressure of the liquid-vapour might be locally modified to an undue degree. For low temperatures carbonic acid, sulphurous acid or ammonia may be used. For moderate temperatures use may be made of volatile liquids such as alcohol and ether and at high temperatures liquid metals such as mercury, potassium or sodium and salts such as diphenyloxide or zinc chloride may be used.

The device according to the invention preferably consists of two interconnected closed vessels each of which contains a certain quantity of liquid. One of the vessels is thermally connected to the object to be measured, whereas the other is thermally connected to the temperature-sensitive element, so that the temperature of these vessels may be deemed to be the same as that of the object contacting therewith. Of these two vessels the highest vessel or, if both vessels are on the same level, both of them are designed in such a manner, that the vapour condensed to liquid therein, which exceeds a fixed quantity in regard to this vessel, is capable of flowing off to the other vessel. Consequently, one or both of the vessels are equipped with a so-called liquid threshold, so that a definite quantity of liquid is always left. An increase in temperature of the object to be measured there involves the vaporisation of a large quantity of liquid and the transport of more heat to the measuring point, where more liquid condenses and flows back again to the first-mentioned vessel. When, in contradistinction thereto, the temperature of the object to be measured decreases, the vapour pressure of the vessel connected thereto decreases so that in this case the quantity of liquid in the other vessel will evaporate and the vapour is moving in an opposite direction. However, this evaporation requires heat which is withdrawn from the vessel and from the temperature-sensitive element so that the temperature at the point of observation also falls immediately. Consequently, temperature drops are likewise quickly recorded and one need not wait until this temperature has decreased as a result of heat elimination, if any, to the surroundings. For this reason the device according to the invention is particularly suitable for a thermostat together with the control mechanism.

In order that the invention may be more clearly understood and readily carried into effect it will now be described more fully with reference to the accompanying drawing representing, by way of example, three forms of construction thereof.

Figure 1:
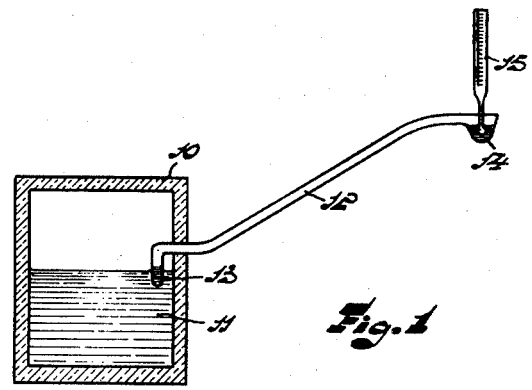
Fig. 1 represents a temperature measuring device according to the invention which is built to a melting furnace.

In Fig. 1 the reference number 10 designates the melting furnace whose heated charge is designated 11. The temperature measuring device consists of a long narrow tube 12 which is furnished at one end with a local widened portion 13 directly contacting with the charge of the furnace, whereas the other end exhibits a cup-shaped widened portion 14 in which the thermometer 15 is placed. The widened portion 13 contains the liquid which is made to evaporate regularly by the heat of the charge 11 of the furnace. This vapor passes through the tube 12, comes into contact with the widened end 14 and the thermometer 15 placed therein and heats it to the temperature which at this point is equal to that of the charge 11 of the furnace. The required heat is supplied by condensation of the vapour to a liquid which accumulates in the cup-shaped widened portion 14. Despite insulation, as the case may be, small heat losses may still occur, so that a continuous stream of vapour, small though it may be, takes place through the tube 12 even at a constant temperature. Once the cup-shaped portion 14 having been completely filled with a definite quantity of liquid the further quantity of condensing vapour will flow back in the form of a liquid through the tube 12 to the end 13. To this end the cup-shaped widening 14 is on a higher level than the end 13. An increase in temperature of the charge 11 of the furnace makes the liquid at the end 13 evaporate more swiftly and consequently involves a stronger stream of vapour through the tube 12 and per time unit more condensing vapour in the vessel 14, where the temperature will consequently increase. If, on the other hand, the temperature of the furnace decreases, the vapour pressure of the liquid 13 will become lower than that prevailing in the vessel 14 at a certain moment, liquid evaporates from the vessel 14 whose temperature decreases. Of course this continues only as long as there is liquid in the vessel 14. Therefore the volume of this vessel may be matched to the duration of the temporary temperature drops to be expected, the degree of thermal radiation and the vaporization heat of the used liquid, as well as to the heat capacity of the vessel.

Figure 2:
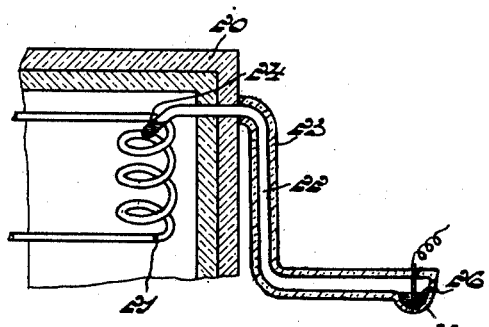
Fig. 2 represents a similar temperature measuring device connected to a cooling box and Fig. 3 represents a temperature measuring device connected with a liquid condenser.

Fig. 2 represents a form of construction suitable for measuring temperatures lower than that of the surroundings of the point of observation, such as is the case, for instance, in a cooling box.

In this instance the vessel 25 is on a lower level than the vessel 24, since the lowest temperature and so, as a rule, the condensation takes place in the vessel 24. The excess liquid in this vessel flows back through the tube 22 to the vessel 25. This tube 22 is passed through the wall 20 of the cooling box and the vessel 24 is in the vicinity of the cooling coil 21. Outside the cooling box the tube 22 is insulated by means of insulating shell 23 to avoid an incorrect temperature measurement due to thermal radiation. In this event a thermo-electric couple instead of a thermometer may be provided in the liquid 26 so that the measuring device may, for instance, be used for throwing in and out the motor pump for the cooling system.

Figure 3:
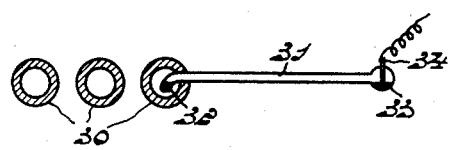

Fig. 3 represents a form of construction which is suitable both for measuring temperatures higher or lower than those of the surroundings of the point of observation, since in this case the condensation effect must be able to occur in both of the vessels and both of the vessels must permit the passage of excess liquid from one vessel to the other. In a set of condenser tubes 30 one of the two liquid-filled vessels 32 is connected to the other vessel 33 through a horizontal tube 31, the thermo-electric coupling 34 being housed in the other vessel. When the temperature of the condenser 30 is higher than that of the surroundings the liquid in the vessel 32 will evaporate regularly and the vapour will move through the tube 31 to the vessel 33. Flowing back in the form of liquid through the tube 31 takes place on reaching the highest level in the vessel 33. When, in contradistinction thereto, the temperature of the condenser is lower than that of surroundings of the vessel 33 the stream of vapour moves through the tube 31 from the vessel 33 to the vessel 32, the liquid passes the threshold of the vessel 32 and flows back in an opposite direction.

While I have shown and described particular embodiments of my invention it is conceded that variations may exist, however, such variations would not depart from the true spirit of the invention.

What I claim is:

1. A device for measuring the temperature of a mass, comprising a closed vessel adapted to be positioned within said mass, a second closed vessel adapted to be positioned in a region exterior to said mass, a quantity of vaporizable liquid medium having discrete portions thereof in each said vessel, a conduit member interconnecting said first and second closed vessels at portions thereof located above the bottoms thereof, respectively, the connection of one of said vessels with said conduit being such that when a given portion of said quantity is contained in said one vessel, an increase in said given portion will cause said medium to overflow into said conduit, said conduit being so positioned relative to said vessels whereby said increase will cause liquid medium to flow from said one vessel to the other whereby a continuous path is formed between said enclosed vessels for vapors of said liquid medium and a discontinuous path is formed between said closed vessels for said liquid medium, and a temperature measuring device having the temperature sensing element thereof extending into the liquid of said second vessel.

2. A device for measuring the temperature of a mass, comprising a closed vessel adapted to be positioned within said mass, a second closed vessel adapted to be positioned in a region exterior to said mass and at a height above said first vessel, a quantity of vaporizable liquid medium having discrete portions thereof in each said vessel, a conduit member interconnecting said first and second closed vessel at portions thereof located above the bottoms thereof, respectively, the connection of one of said vessels with said conduit being such that when a given portion of said quantity is contained in said one vessel, an increase in said given portion will cause said medium to overflow into said conduit, said conduit being so positioned relative to said vessel whereby said increase will cause liquid medium to flow from said one vessel to the other whereby a continuous path is formed between said enclosed vessels for vapors of said liquid medium and a discontinuous path is formed between said closed vessels for said liquid medium, and a temperature measuring device having the temperature sensing element extending into the liquid of said second vessel.

3. A device for measuring the temperature of a mass, comprising a closed vessel adapted to be positioned within said mass, a second closed vessel adapted to be positioned in a region exterior to said mass and at a height below said first vessel, a quantity of vaporizable liquid medium having discrete portions thereof in each said vessel, a conduit member interconnecting said first and second closed vessels at portions thereof located above the the bottoms thereof, respectively, the connection of one of said vessels with said conduit being such that when a given portion of said quantity is contained in said one vessel, an increase in said given portion will cause said medium to overflow into said conduit, said conduit being so positioned relative to said vessels whereby said increase will cause liquid medium to flow from said one vessel to the other whereby a continuous path is formed between said enclosed vessels for vapors of said liquid medium and a discontinuous path is formed between said closed vessels for said liquid medium, and a temperature measuring device having the temperature sensing element extending into the liquid of said second vessel.

4. A device for measuring the temperature of mass, comprising a closed vessel adapted to be positioned within said mass, a second closed vessel adapted to be positioned in a region exterior to said mass and at a height substantially equal to that of said first vessel, a quantity of vaporizable liquid medium having discrete portions thereof in each said vessel, a conduit member interconnecting said first and second closed vessel at portions thereof located above the bottoms thereof, respectively, the connection of one of said vessels with said conduit being such that when a given portion of said quantity is contained in said one vessel, an increase in said given portion will cause said medium to overflow into said conduit, said conduit being so positioned relative to said vessels whereby said increase will cause liquid medium to flow from said one vessel to the other whereby a continuous path is formed between said enclosed vessels for vapors of said liquid medium and a discontinuous path is formed between said closed vessels for said liquid medium, and a temperature measuring device having the temperature sensing element extending into the liquid of said second vessel.

HERRE RINIA.

REFERENCES CITED

The following references are of record in the file of this patent:

UNITED STATES PATENTS

| Number | Name | Date |
|---|---|---|
| 2,356,607 | O'Brien | Aug. 22, 1944 |